United States Patent [19]

Vlah

[11] Patent Number: 4,947,292

[45] Date of Patent: Aug. 7, 1990

[54] LIGHTING SYSTEM

[76] Inventor: John A. Vlah, 14330 Georgia Rd., Middlefield, Ohio 44062

[21] Appl. No.: 268,711

[22] Filed: Nov. 8, 1988

[51] Int. Cl.$^5$ .......................... F21Y 8/00; F21Y 7/12
[52] U.S. Cl. ........................ 362/32; 362/346; 362/347
[58] Field of Search ............... 362/31, 32, 217, 296, 362/297, 346, 347

[56] References Cited

U.S. PATENT DOCUMENTS

| | | | |
|---|---|---|---|
| 1,591,287 | 7/1926 | Davis | 362/346 |
| 1,661,077 | 2/1928 | Marsat | 362/217 |
| 1,815,751 | 7/1931 | Whalen | 362/346 |
| 1,835,745 | 12/1931 | Barbian | 362/300 |
| 1,913,517 | 6/1933 | Smith et al. | 362/217 |
| 3,023,304 | 2/1962 | Peterson | 362/31 |
| 3,776,637 | 12/1973 | Hecht | 356/156 |
| 4,150,422 | 4/1979 | Peralta et al. | 362/296 |
| 4,229,779 | 10/1980 | Bilson et al. | 362/217 |
| 4,260,220 | 4/1981 | Whitehead | 350/96.88 |
| 4,517,631 | 5/1985 | Mullins | 362/34 R |
| 4,610,518 | 9/1986 | Clegg | 356/630 |
| 4,615,579 | 10/1986 | Whitehead | 356/96.1 |
| 4,725,934 | 2/1988 | Gordih | 362/346 |
| 4,729,067 | 3/1988 | Ohe | 362/31 |
| 4,733,332 | 3/1988 | Yamashita et al. | 362/32 |
| 4,738,510 | 4/1988 | Sansom | 362/32 |
| 4,747,030 | 5/1988 | Offner et al. | 362/32 |
| 4,748,543 | 5/1988 | Swarens | 362/260 |
| 4,800,468 | 1/1989 | Yokoyama | 362/346 |
| 4,841,455 | 6/1989 | Leberl et al. | 362/31 |

FOREIGN PATENT DOCUMENTS

| | | | |
|---|---|---|---|
| 67892 | 12/1982 | European Pat. Off. | 362/31 |
| 777623 | 2/1935 | France | 362/347 |
| 46786 | 9/1936 | France | 362/347 |

OTHER PUBLICATIONS

R. Lawlor, *Sacred Geometry*, Thames and Hudson Inc., New York, 1982, pp. 65-73.

3M Corporation, *Scotchlamp Film TM*, Special Enterprises Division, 3M Traffic Control Materials Division, St. Paul, Minn., no date.

*Primary Examiner*—Ira S. Lazarus
*Assistant Examiner*—Richard Cole
*Attorney, Agent, or Firm*—Watts, Hoffmann, Fisher, Fisher & Heinke Co.

[57] ABSTRACT

A lighting system having a light source is disposed inside the reflective inner surface of a reflector. The longitudinal profile of the reflector is a continuous curve comprised of four substantially circular arcs and a parabolic segment. A first arc lies nearest the source. A second arc having a radius of substantially $\frac{1}{2}(1+\sqrt{5})$ times the radius of the first "continues" the first in the sense that the arcs have the same slope at their point of contact. Likewise, a third arc having a radius of substantially $\frac{1}{2}(1+\sqrt{5})$ times the radius of the second continues the second arc and a fourth has a radius substantial $\frac{1}{2}(1+\sqrt{5})$ times the radius of the third. The parabolic segment continues the fourth arc and completes the profile. Internal and external reflecting means may be provided to further align and direct the exiting light.

24 Claims, 12 Drawing Sheets

LIGHTING SYSTEM

TECHNICAL FIELD

The present invention relates generally to lighting systems and more particularly to systems including reflectors for producing a uniform directional output and illumination through a light pipe.

BACKGROUND ART

One technique for providing soft, uniform lighting is to direct light from a source into a hollow light pipe having walls which selectively resist the passage of light. Since only a fraction of the light stricking a wall is able to escape, the pipe disperses the light along its length.

An example of a wall material for use in such light pipes is an acrylic plastic sheet marketed by the Minnesota Mining and Manufacturing Co. of St. Paul, Minn. under the trademark SOLF. The sheet, approximately 0.022 inch in thickness, has a smooth inner surface and a grooved outer surface forming a series of 90° isosceles prisms running along the length of the sheet. Light entering the sheet through the inner surface at an angle less than or equal to 27.6° from parallel to the sheet is trapped and reflected back through the inner surface, while light striking the sheet at a steeper angle is transmitted through the sheet. Since a hollow pipe composed from SOLF is able to distribute and conduct light along its length, the tube is able to distribute the intensity of exiting light across its length.

The distribution of light which exits the light pipe may be controlled to some degree by inserting an "extractor," i.e. a sheet of reflective material, into the light pipe. The "extractor" acts as a light releasing mechanism to turn a portion of the light at an angle steep enough to exit.

A reflector is usually provided to capture light emanating from the source and directing the light into the pipe. In one device, a lamp is placed at a focus of either a parabolic or elliptical reflector which opens directly into the light pipe. Light emitted from the lamp away from the light pipe is collected by the reflector and directed back into the pipe.

While inexpensive, this device has drawbacks. One drawback of parabolic and elliptical reflectors is size. Another drawback is they do not direct light uniformly over the cross-section of the pipe entrance. Since the lamp is directly exposed to the pipe, the intensity of light entering the pipe is heavier near the center than toward the sides. As a result, the intensity of the light leaving the pipe is less over its surface area than if the distribution of light across the entrance of the pipe were uniform. This problem is all the more significant if the reflector is used with one of the smaller, higher intensity bulbs recently developed in order to conserve energy.

Furthermore, the light pipe is exposed to heat from the lamp which could damage the pipe or transfer unwanted heat into the area being illuminated.

Another drawback of the device is that light is reflected back into the source, resulting in a waste of light.

Various reflector shapes have been proposed for other applications which, had they ever been altered or adapted for coupling to a light pipe, might isolate the light source from the reflector outlet area. These reflectors are often formed in one piece and have a continuous profile around the source. These profiles may be composed of a single curve, such as an ellipse, circular involute or circular spiral, or may be built up from segments of several curves. Since the outlet is at least partially shielded from the direct glare of the lamp, the "bright spot" which might otherwise appear at the exit is attenuated.

For example, the "paracyl" reflector is comprised of a section with a circular profile and a section with a parabolic profile. The profile is "continuous" at the point where the sections meet, i.e. the profile curves have the same slope. The lamp is partially isolated within the circular section and the light is directed out of the reflector by the parabolic section.

While reflectors such as the paracyl help isolate the light source from the exit, they are not very efficient in directing light to their outlets with the degree of alignment which would facilitate conduction of the light were a pipe coupled to their outlet. Indeed, light emitted from the lamp at certain angles is either reflected back into the source or lost in the reflector so that more power is required to maintain the same intensity of illumination.

DISCLOSURE OF THE INVENTION

These drawbacks of the prior art are overcome by a lighting system including a novel volute reflector made in accordance with the present invention.

In one embodiment, a light source is disposed inside the reflective inner surface of a compact, small sized, main reflector. The longitudinal profile of the main reflector is a continuous curve comprised of four substantially circular arcs and a parabolic segment.

A first arc lies nearest the source. A second arc having a radius of substantially $\frac{1}{2}(1+\sqrt{5})$ times the radius of the first "continues" the first in the sense that the arcs have the same slope at their point of contact. Likewise, a third arc having a radius of substantially $\frac{1}{2}(1+\sqrt{5})$ times the radius of the second continues the second arc and the fourth substantially $\frac{1}{2}(1+\sqrt{5})$ times the third. The fourth arc connects with a parabolic segment. The parabolic segment completes the profile and terminates at the lower end of the outlet area.

In another embodiment, the cross-sectional profile of the main reflector is substantially parabolic but has a flat portion for accommodating the length of the light source. For purposes of economy the cross sectional profile can be made flat in a section adjacent the outlet while the smaller section is substantially parabolic. Alternatively, the cross sectional profile may be flat for certain applications.

In another embodiment, the main reflector has a plurality of internal reflectors mounted near the source for directing a light away from "dispersive points" on the inner surface of the reflector which would tend to disperse the light out of substantial alignment with a preferred exit direction, i.e. parallel to the axis of a light pipe placed at the outlet area of the main reflector. The main reflector also mounts a plurality of external reflecting means positioned near the outlet area of the main reflector for directing light near the outlet area toward a preferred exit direction, i.e. parallel to the exit of a light pipe placed over the outlet area.

In another preferred embodiment of the lighting device, a reflector and light source as described above are connected to one or both ends of the light pipe.

As alternatives to the preferred reflector profile described above, the reflector may be shaped as a "Golden Section spiral". That is, the longitudinal profile of the reflector may be built up from five circular arcs rather than ending in a parabolic arc. The fifth arc would continue the fourth arc and have a radius $\frac{1}{2}(1+\sqrt{5})$ times that of the fourth.

One of the outstanding features of the invention is that a lighting device is provided which provides soft, uniform, directional lighting. The reflector of the present invention is particularly suited to use with a light pipe since it shields the pipe from direct exposure to the light source, thus eliminating "bright spots," and directs light into the pipe in substantial alignment with the axis of the pipe so that the light is conducted efficiently along the pipe.

Another outstanding feature of the system is that little energy is dissipated in the reflector. No light is reflected back into the source and all light exiting the source leaves the reflector within four reflections. Furthermore, since the source is shielded from the pipe, unwanted heat from the source is not transferred to the pipe.

Additional features and advantages of the invention will become apparent and a fuller understanding obtained by reading the following detailed description in connection with the accompanying drawings.

BEST MODE FOR CARRYING OUT THE INVENTION

Figure 1:
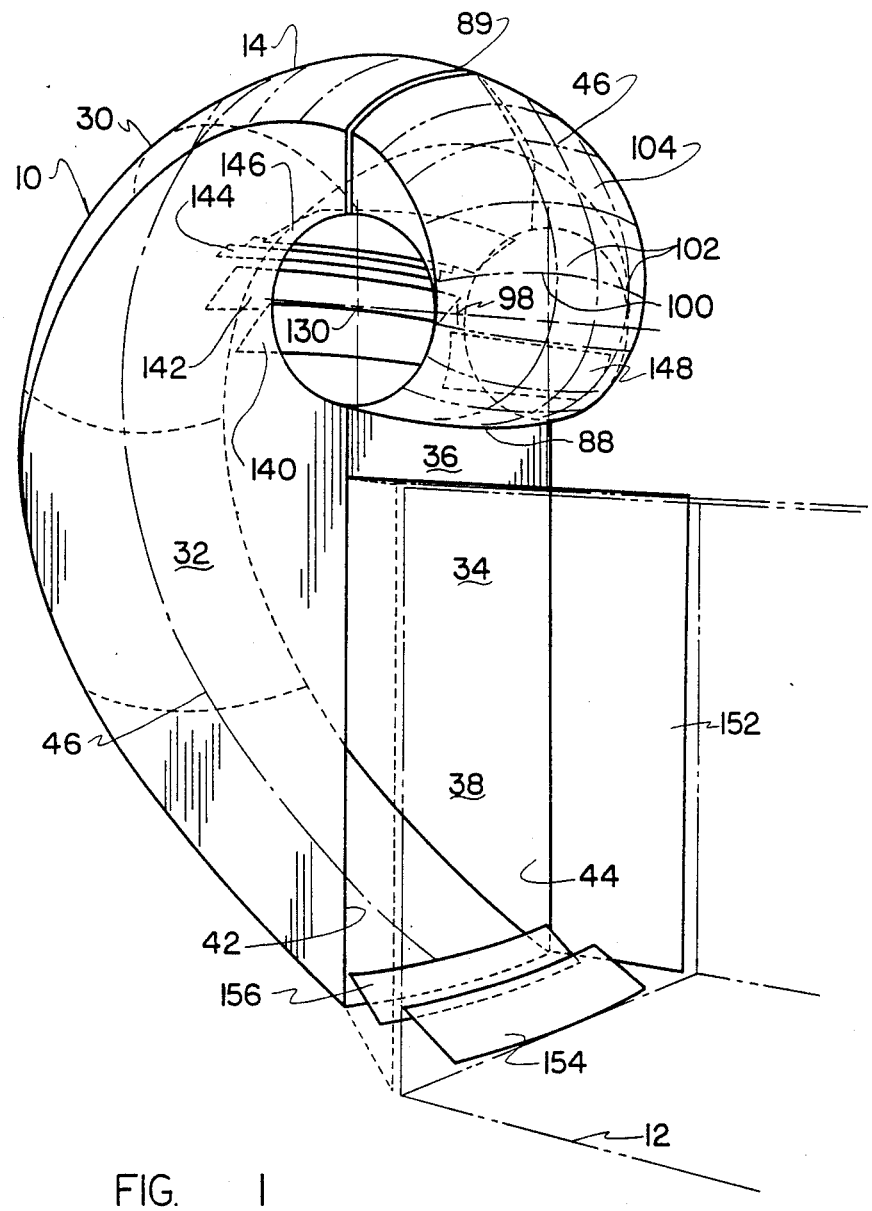
FIG. 1 is a perspective view of a lighting device according to the present invention.
Figure 3:
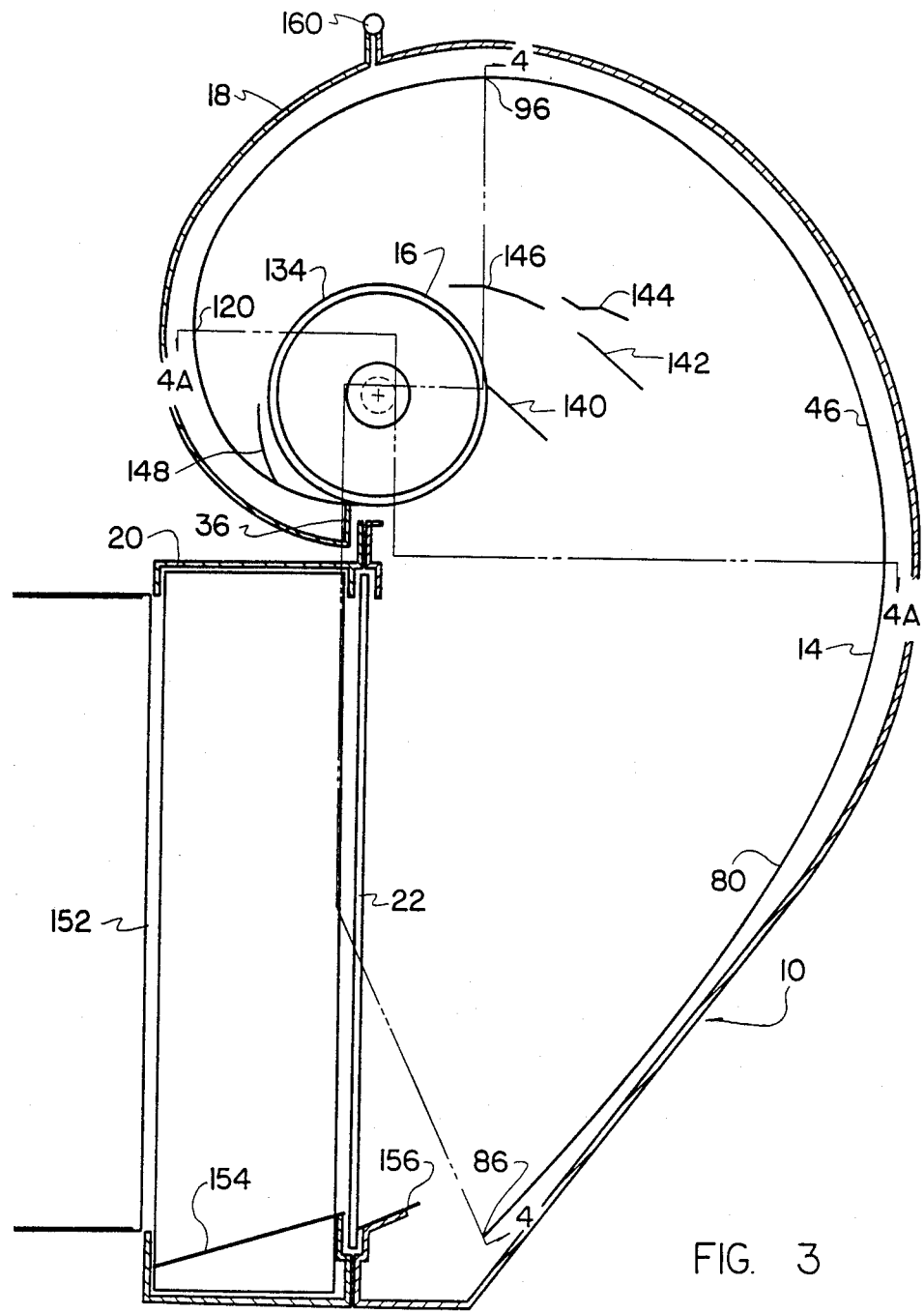
FIG. 3 is a sectional elevational view of the embodiment of FIG. 1.

Referring now to the drawings and to FIGS. 1 and 3 in particular, a lighting system embodying the invention is shown generally at 10. The lighting system 10 includes a light pipe 12; a reflector 14; a light source 16; internal reflectors 140, 142, 144, 146 and 148; external reflectors 150, 152, 154 and 156; a main reflector housing 18; an external reflector housing 20 and a heat-resistant glass plate 22 with a non-reflective coating on both sides.

Figure 10:
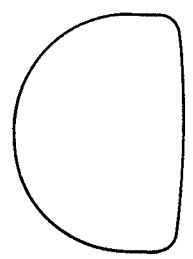
FIG. 10 is a cross-sectional view of one light pipe configuration.

In a preferred embodiment for service station illumination, the light pipe 12 is a hollow tube of D shaped cross-section. The walls are of the configuration shown in FIG. 10 and composed of an acrylic plastic sheet of the type marketed by the 3M, Inc. of St. Paul, Minn. under the trademark SOLF. Since the pipe cannot trap light entering at an angle steeper than 27.6° from the axis of the pipe, it is preferable that light enter the tube at angles less than 27.6°.

A main reflector 14 embodying the present invention 10 and particularly well adapted for use with the SOLF light pipe is shown in FIG. 1. The reflector 14 is a shell composed of metal (preferably aluminum) glass or ceramic. The reflector has a curved back portion 30 and flat side walls 32, 34. The curved portion 30 may be extended to enclose the reflector 14. A structural section 36 is provided extending down from the main reflector 30 to close the gap between the outer surface of the curved portion 30 and an outlet area 38.

If the main reflector 14 is composed of metal, the inner surface 40 of the curved portion 30 is polished to a smooth specular finish and the inner surfaces 42, 44 of the side walls, to a smooth or vertical brushed specular finish. If the main reflector 14 is composed of ceramic or glass, the inner surface 40 is plated or coated with a reflective coating, preferably a dichromic coating which allows heat-carrying infra-red rays to escape. The outline shape of the main reflector 14 may be obtained from formed or extruded aluminum or by casting in two pieces.

The main reflector 14 is symmetric about a plane indicated by a center line 46. The longitudinal profile of the reflector 14 is in the form of a curve built up from a "Golden Section" spiral and a parabolic arc.

Figure 8:
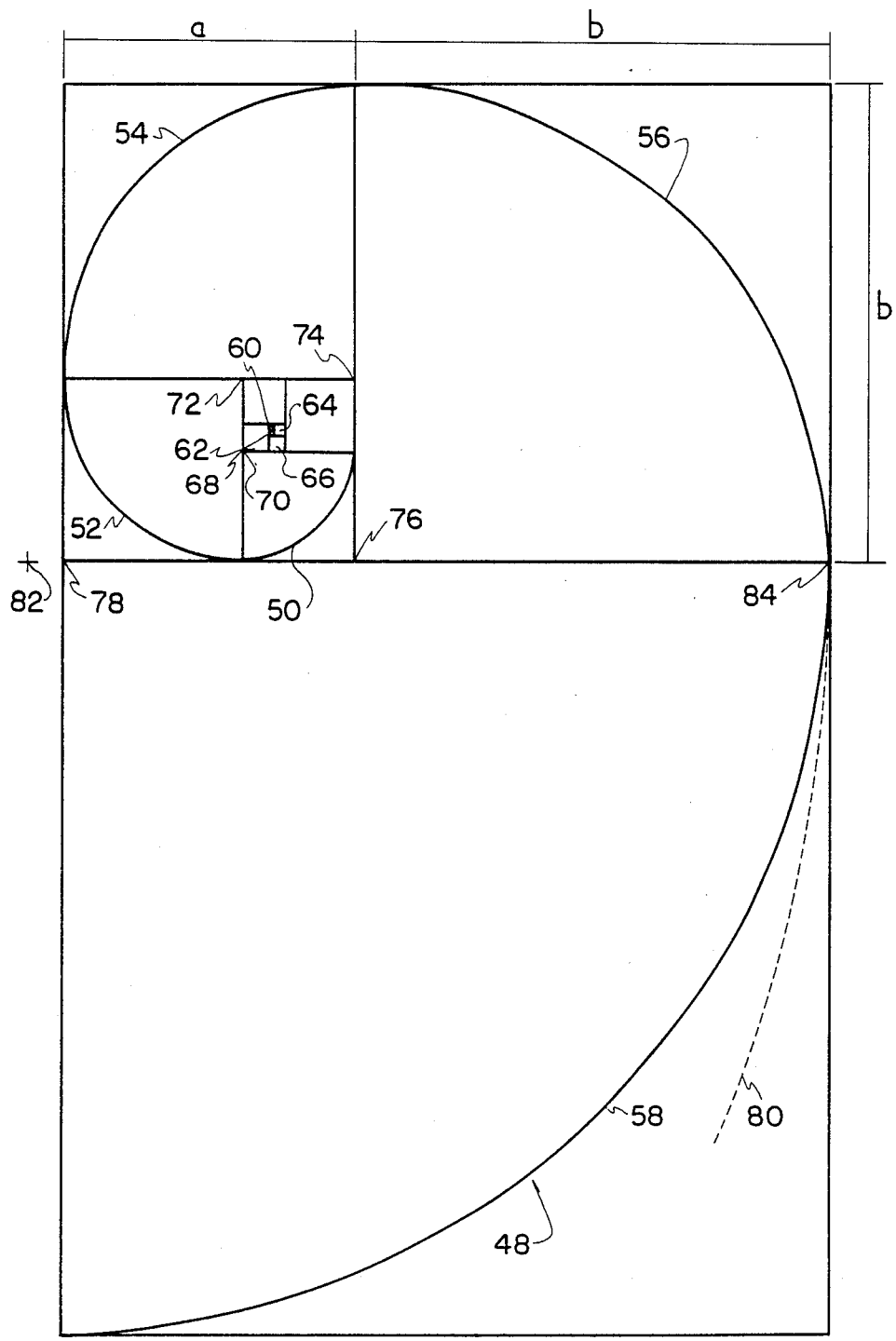
FIG. 8 is a schematic view illustrating a method for constructing a "Golden Section" spiral.

A technique for generating a "Golden Section" spiral, also known as a volute, is illustrated in FIG. 8. A section of a "Golden Section" spiral of just over 360° is shown generally as 48. The section shown in FIG. 8 is composed of five circular arcs 50, 52, 54, 56 and 58.

The construction is based on the "Golden Section," a "treasure of geometry" known since the sixth century and appearing in many natural forms such as Nautilus shells. If a line is divided so that the smaller part is to the larger as the larger is to the sum of the two, the division is called a "Golden Section." The ratio of the larger to the smaller length will then be $\frac{1}{2}(1+\sqrt{5}) : 1$, i.e. approximately 1.6180339 : 1.

A series of nested "Golden Section" rectangles, i.e. rectangles in which the ratio of the lengths of the larger and smaller sides is $\frac{1}{2}(1+\sqrt{5}) : 1$, may be used to locate the "Golden Section" centers for the arcs which make up a "Golden Sections" spiral.

As shown in FIG. 8, a series of nested "Golden Section" rectangles may be approximated by first drawing a pair of adjacent congruent squares 60, 62. Next a third square 64 is drawn adjacent the joint length of the prior squares 60, 62. Subsequent squares 66, 68, etc. are drawn adjacent the larger side of the nested pattern so as to form a series of nested rectangles in which the ratios of the lengths of the larger and smaller sides are the ratios of successive Fibonacci numbers. The series composed of the quotient of successive Fibonacci numbers converges rapidly to $\frac{1}{2}(1+\sqrt{5})$; the error in the seventh term is approximately 0.2%. Thus, the series of nested rectangles constructed in this manner converge rapidly to "Golden Section" rectangles.

Once a framework of nested "Golden Section" rectangles is constructed, the "Golden Section" spiral may be built up from circles centered on vertices of the rectangles. For example, Arc 50 is centered on vertex 70; arc 52, on vertex 72; arc 54, on vertex 74; etc. These "Golden Section" centers themselves spiral about the nested rectangles. The radius of each arc is the side length of the square in which the arc lies. As appears from FIG. 8, the ratios of the radii of succeeding arcs is $\frac{1}{2}(1+\sqrt{5}) : 1$ and each succeeding arc continues the preceding in the sense that each has the same slope at their point of meeting.

Figure 6:
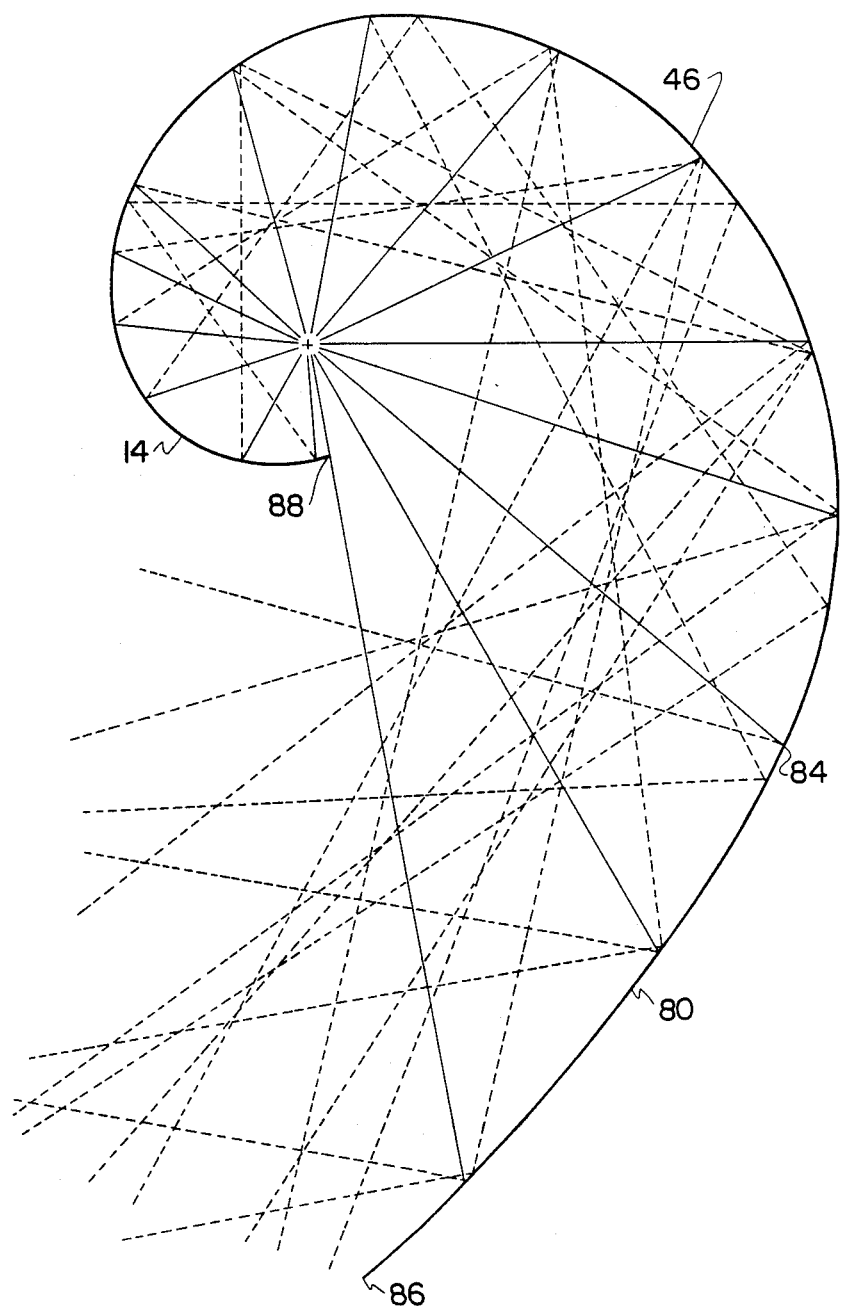
FIG. 6 is a schematic view of the reflector in accordance with the preferred embodiment without the internal and external reflectors showing the paths of light rays emanating from a source located at the "Golden Section" center.

As shown most clearly in FIGS. 3 and 6, the profile of a preferred embodiment of the main reflector 14, while based on the "Golden Circle" spiral, includes a final parabolic section 80 which directs the light rays emitted from the reflector in a less focused manner that results in a more even distribution of lighting along the pipe. As shown in FIG. 8, the focus 82 of this parabolic arc 80, shown in phantom, falls on a line extending through points 78 and 84. The center of the parabola continues the last circular arc 56 and the opposite end of the arc reaches below an external reflector 156. While the particular position of the focus 82 and the focal length described here are useful in the service station embodiment, the focus and focal length are chosen depending on the desired lighting distribution.

Figure 7:
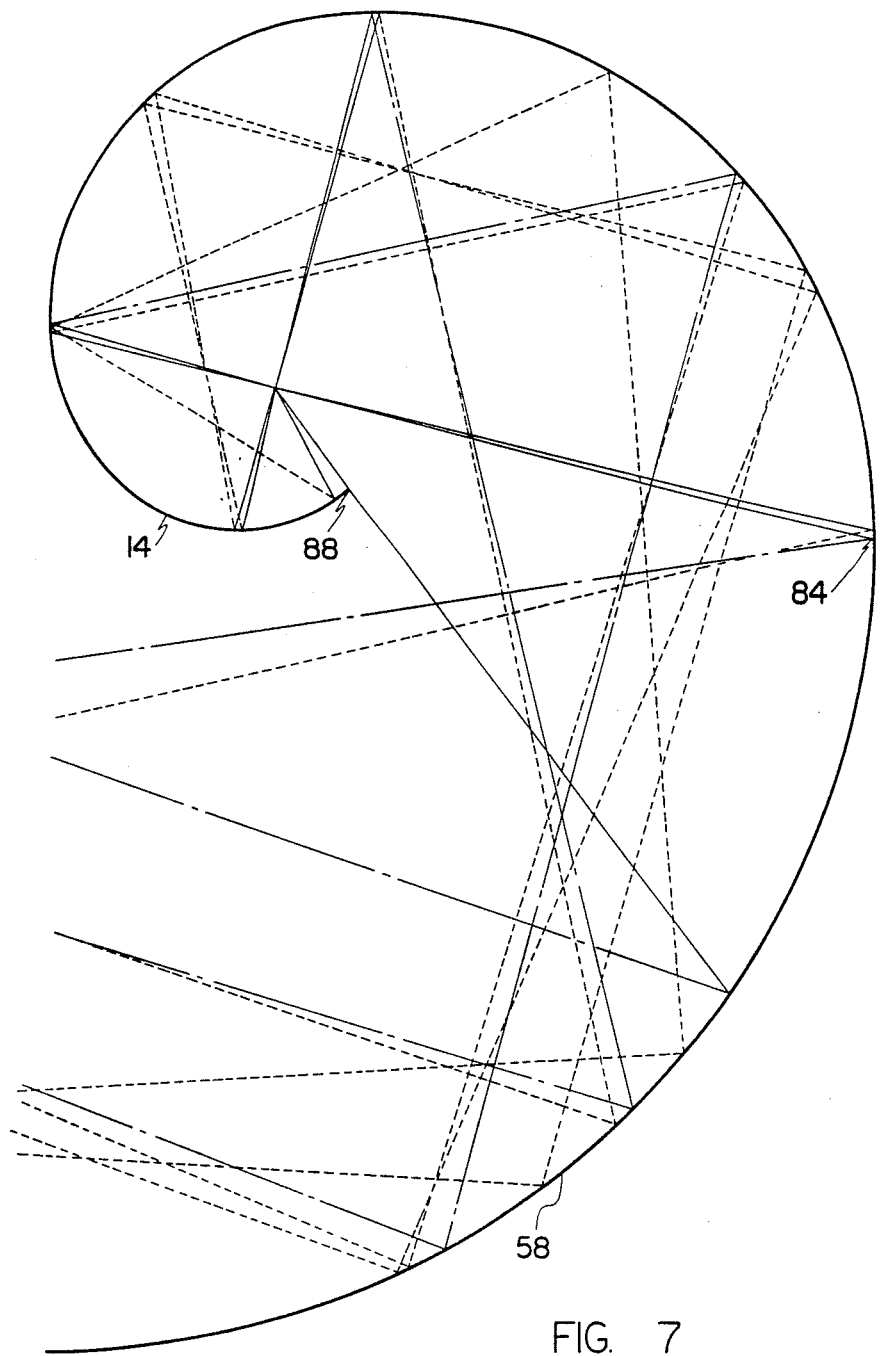
FIG. 7 is a schematic view of a reflector having a longitudinal profile in the form of a "Golden Section" spiral showing the paths of light rays emanating from a source located at the "Golden Section" center.

How far the "Golden Section" spiral curls in toward the light source, as at 88 in FIG. 7, is determined by the physical size of the light source and the desired direction of light output from the reflector.

Figure 4:
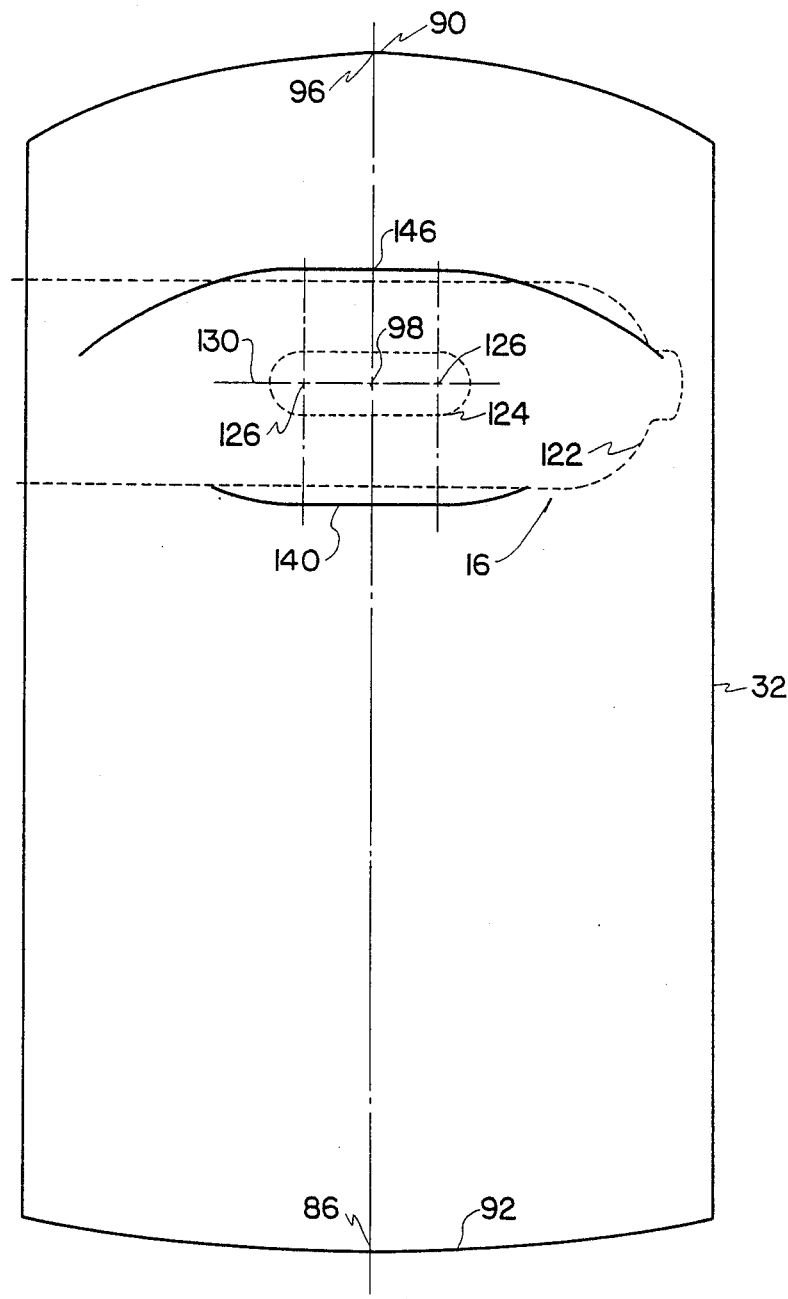
FIG. 4 is a sectional view as seen from a plane indicated by line 4—4 in FIG. 3.
Figure 4A:
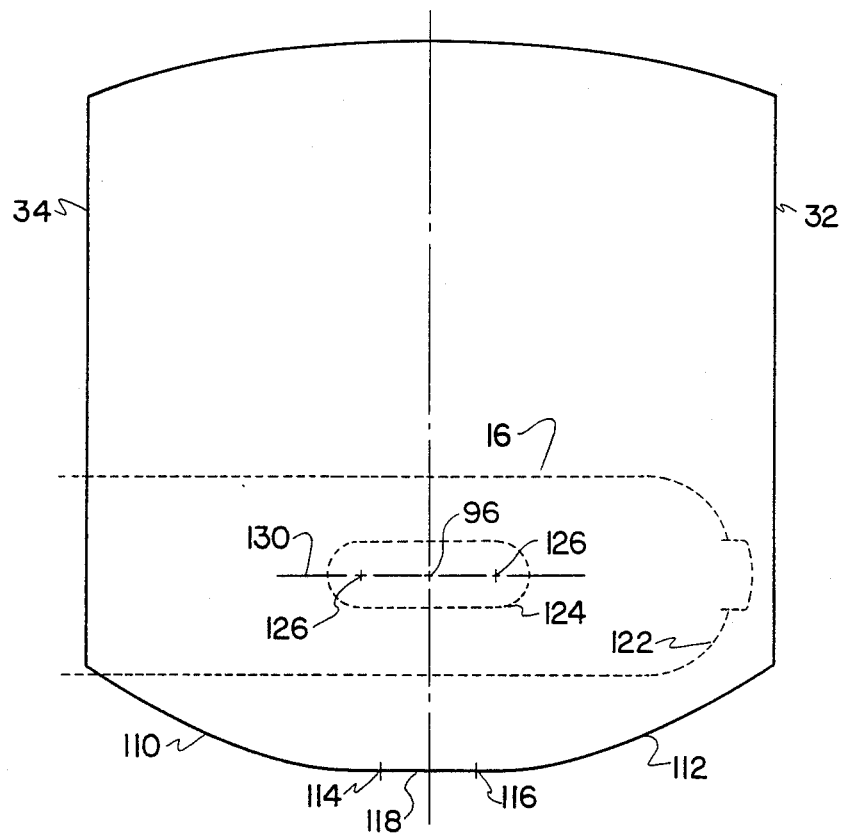
FIG. 4A is a sectional view as seen from a plane indicated by line 4A—4A in FIG. 3.

As best shown in FIGS. 1, 4 and 4A, a preferred embodiment of the main reflector 14 has a curved portion 30 with a cross-sectional profile which is substantially parabolic.

The area of the curved portion 30 farther from the light source center 98, i.e. beyond a section 89 as shown in FIG. 1, has a cross-sectional profile which is entirely parabolic. As shown best in FIG. 4, the focal length of the parabolic sections, i.e. the distance from the focus to the parabolic center, equals the distance from the center 98 of the light source 16 to the parabolic center of the cross-section. Thus, the cross-sectional profile is sharper in sections nearer the light source 16, such as 90, than in sections farther from the light source, such as 92. The centers 86, 96 of each parabolic section lies on the plane of symmetry of the main reflector and the central axis of each section is directed toward the center of the longitudinal circular arc of the "Golden Section" spiral (or the focus of the terminating parabolic arc) from which the cross-section is taken.

On sections of the curved portion 30 nearer to the light source center 98 than section 89, however, the parabolic cross-sectional profiles 100 are broken at their parabolic center 102 by a flat section 104 so as to accommodate the length of the light source 16. As best shown in FIG. 4A, the sides of the profile 108 are parabolic arcs 110, 112 symmetric about a cross-section center 120 and having parabolic centers at 114, 116. Between 114 and 116 is a flat section 118 centered on point 120 lying on the longitudinal profile 46. The focal lengths of the parabolic arcs 110, 112 are equal to the distance from the light source center 98 to the cross-section center 120 and the central axis of each section is directed toward the center of the longitudinal circular arc of the "Golden Section" spiral from which the cross-section is taken. Since the slopes of the parabolic arcs 110, 112 at their parabolic centers 114, 116 are flat, the cross-section profile is continuous throughout.

Figure 2:
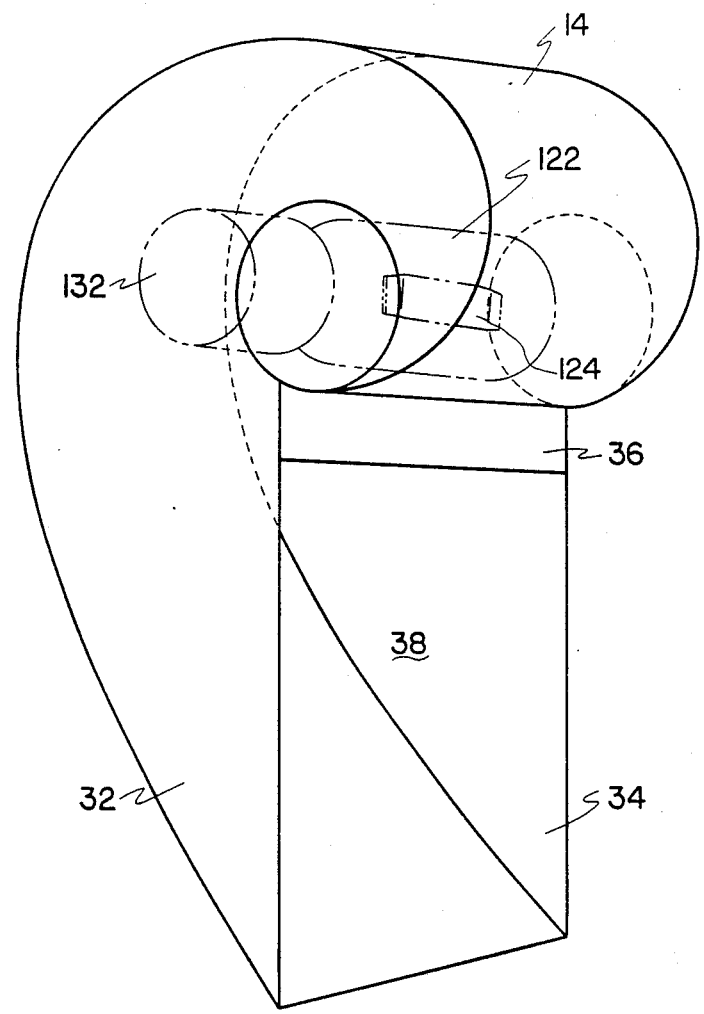
FIG. 2 is a simplified perspective view of a reflector according to the present invention with a light source positioned inside.
Figure 2A:
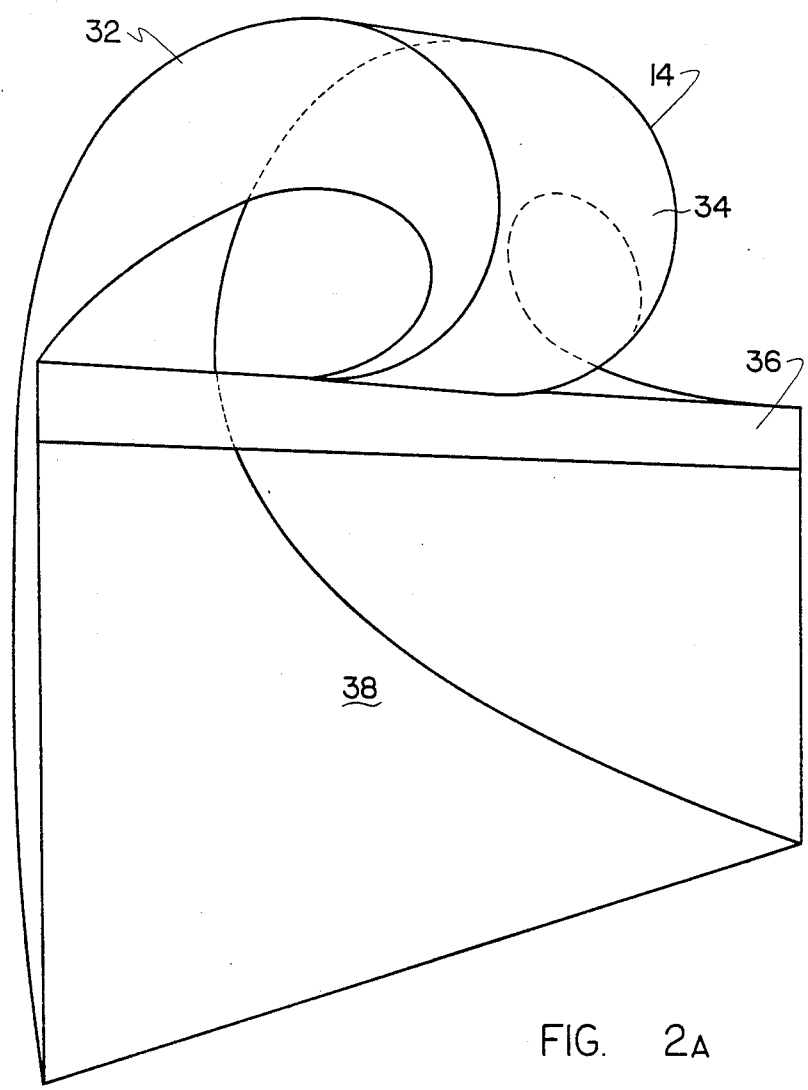
FIG. 2A is a simplified perspective view of another reflector in accordance with the present invention.

FIGS. 2 and 2A show alternative embodiments of the main reflector, designated generally as 14' and 14". Although each of these embodiments like the others is well-suited for directing light into a light pipe or as stand alone fixtures, these embodiments are better suited for use as lighting fixtures by themselves. In particular, a lighting device having a light source positioned inside the reflectors of FIGS. 2 and 2A will produce a directional output without producing direct lamp glare since the lamp is not directly visible outside the reflector from any angle.

The reflector may have side walls 32', 34' which are parallel as in FIG. 2 or side walls 32", 34" angled with respect to the plane of symmetry of the reflector as in FIG. 2A. For example, placing the side walls at a 45° angle to the plane of symmetry, as in FIG. 2A, increases the efficiency of the lighting system and control over the distribution of lighting intensity. The distribution of the light emitted from the reflector may be further manipulated by varying the lower portion of the longitudinal profile, such as by adding either a circular arc like 58 shown in solid in FIG. 8, a parabolic arc like 80 shown in phantom in FIG. 8, or an elliptical arc. Similarly, the reflector may include sections of parabolic and flat cross-section, balancing control against economy. The light emitted from the reflector may be controlled even further with the use of baffles, louvers, diffusers, polarizing panels, prismatic panels, lenses or color filters.

In one alternative embodiment, the longitudinal profile of the main reflector 14 is in the form of a "Golden Section" spiral which reaches all the way to the outlet area 38, as shown in solid in FIG. 8, rather than terminating in a parabolic section 80. As FIGS. 6 and 7 show, however, the addition of the parabolic arc 80 at the end of the profile 46 results in a less focussed and more uniform distribution of light across the entire outlet area of the reflector. FIGS. 6 and 7 are schematic diagrams of the distribution of light rays exiting the reflector as determined through laser experiments and calculations. The embodiment with a parabolic arc is preferred because it allows better control in a smaller physical size.

While the less focussed output shown in FIG. 6 is preferable for use with light pipes, it should be noted that the output shown in FIG. 7 may be preferable for other applications.

In a preferred embodiment, the light source 16 is a high intensity metal halide bulb. Any arc-type or filament-type bulb will do, though the present invention works best with a "point"-type light source. A linear filament source will also work well. The reflector shape of the present invention will be particular useful as manufacturers develop very small, high intensity arc and filament lamps to help meet the needs of energy conservation and lighting control.

As shown best in FIG. 2, an arc-type light source would have an outer jacket 122 covering an arc tube 124, which in turn contains the arcing electrodes extending from the ends of the arc tube 124 to points 126, 128. The light source would be symmetric about an center axis 130 and could be treated as approximately a line source lying on that axis.

One example of a metal halide bulb well suited for use in the present invention is that marketed under the designation HQI-T 1000 W/D by the Osram Corporation of Montgomery, N.Y.

The center axis 130 of the light source 16 should be placed as closely as possible to the theoretical limit center of the "Golden Section" circle which makes up the longitudinal profile 46 of the main reflector 14. (In FIG. 8, this "theoretical limit center" would lie somewhere in square 62.)

As shown in FIG. 1, a number of internal and external reflectors are positioned within the main reflector 14 and at the outlet area 38 so as to better align and direct light which would otherwise exit the main reflector at angles too steep for the light pipe 12 to efficiently conduct.

Figure 5:
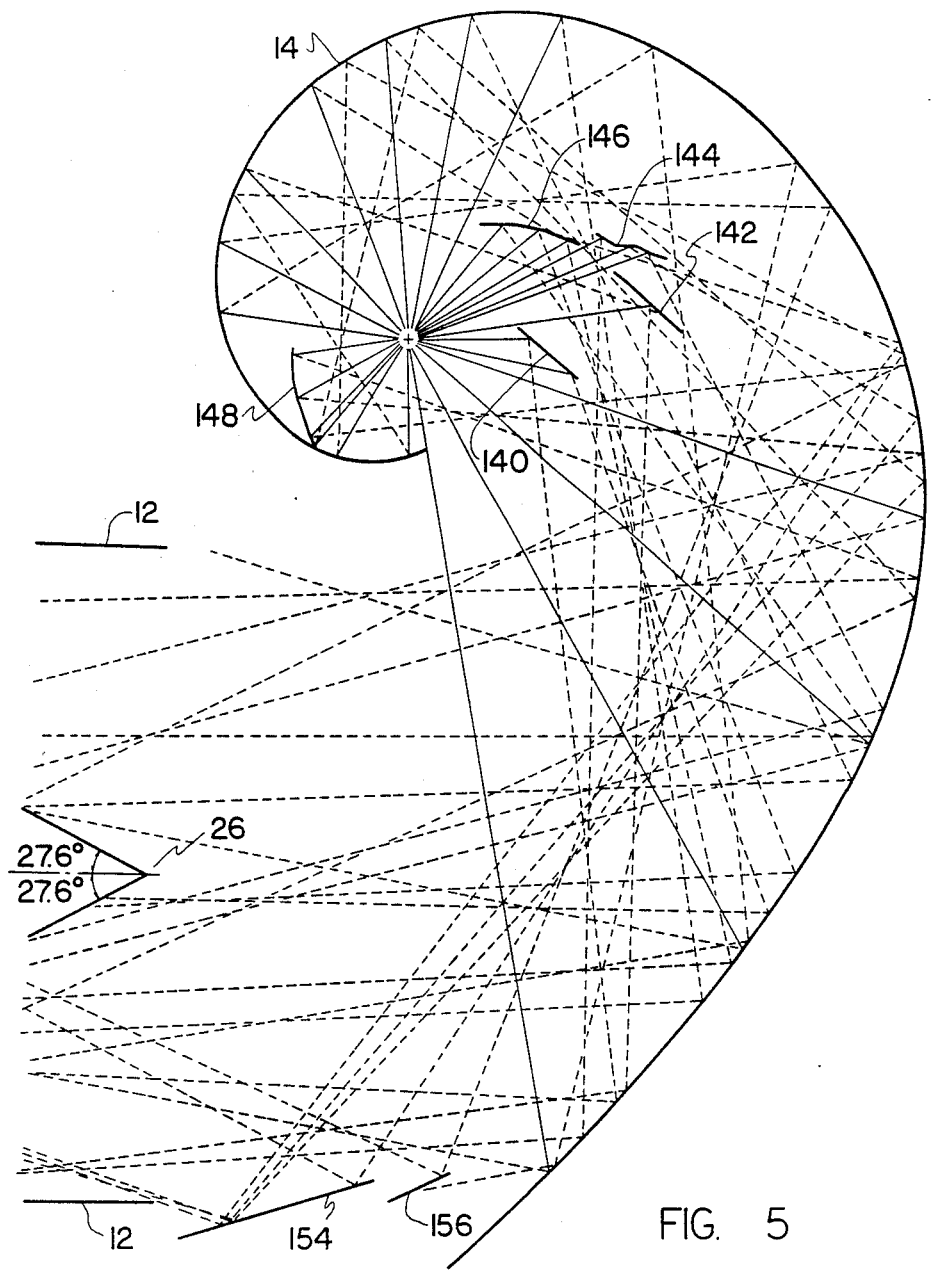
FIG. 5 is schematic view of the reflector in accordance with the preferred embodiment including internal and external reflectors showing the paths of light rays emanating from a source located at the "Golden Section" center.

FIGS. 5 and 6 illustrate the pattern of light emitted from the main reflector 14 having the preferred longitudinal profile with and without internal and external reflectors as determined by laser test and calculations. As the two figures indicate, the light exiting the main reflector 14 with the internal and external reflectors as shown in FIG. 5 is more uniformly distributed across the outlet area and better aligned than the light exiting the main reflector alone as illustrated in FIG. 6. Furthermore, all of the light emanating from the source exits the reflector in four or fewer reflections so that the light exits the main reflector with little dissipation. Once again, it should be noted that while the increased uniformity and collimation produced by the internal and external reflectors is desirable for use with a light pipe, it may be less desirable for other applications.

In a preferred embodiment, five internal reflectors 140, 142, 144, 146, 148, 150 are placed near the light source 16. Reflectors 140, 142, 144, 146 are fixed at either end to the side walls 32, 34 of the main reflector 14 while reflector 148 is fixed to the curved portion of the main reflector 14 at its base. Each is positioned so as to deflect light from a region of "dispersive points," i.e. a region of points which direct light so as to eventually exit the reflector at an angle too steep for the light pipe to conduct efficiently. Preferred positions and longitudinal profiles for these internal reflectors are shown in FIGS. 1 and 3, and the profiles of the reflectors perpendicular to the section of FIG. 3 are symmetric with respect to the plane of symmetry of the main reflector 14 and parabolic except where demands of space require that they be made flat. Where parabolic, the focal lengths of the reflectors equal the distance from the parabolic centers of the section to the center 98 of the light source 16, as was the case with the cross-sectional profiles of the curved portion 30 of the main reflector 14. For economy, the reflectors 140, 142, 144, 146, 148 will in practice often be flat.

The external reflectors 150, 152, 154, 156 are arranged around the outlet area so as to "corral" light emitted at an undesirable angle. In a preferred embodiment, two flat reflectors 150, 152 are positioned at the sides of the outlet area and two reflectors 154, 156 of parabolic cross-section are mounted on the external reflector housing 20 at the bottom of the outlet area. The parabolic cross-sectional profiles of the reflectors 154, 156 are determined as were the profiles for the internal reflectors and the curved portion of the main reflector. For economy the reflectors 154, 156 will in practice often be flat.

In a preferred embodiment, the main reflector housing 18 is composed of two pieces hinged as at 160 in FIG. 3 so as to allow access to the light source. The structural section 36 may be integral with the main reflector housing 18. Alternatively, the light source 16 may be inserted or removed through a clearance hole 134 running through the reflector 14 and installed in a socket 132. The external reflector housing 20 may be constructed separately from the main reflector housing 18 and the two may be fastened together in any conventional manner. A frame may be formed between the main reflector housing 18 and the external reflector housing 20 so as to hold a pane of heat-resistant glass over the outlet area to shield the light pipe 12 from heat generated by the light source 16.

Figure 9A:
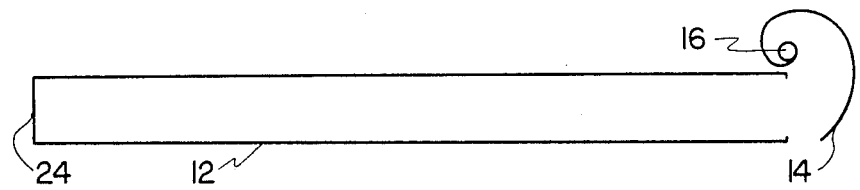
FIGS. 9A–9G are schematic views of various alternative embodiments of the lighting system of the present invention.
Figure 9B:
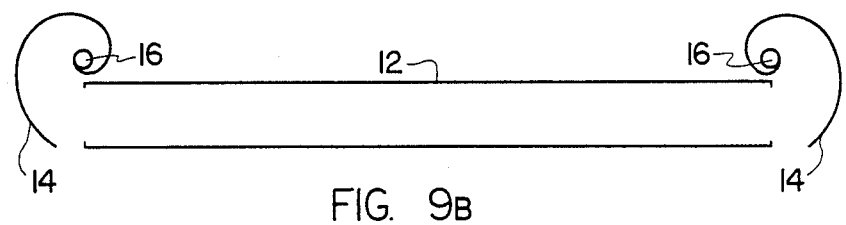

FIGS. 9A–9G illustrate other embodiments of the lighting device of the present invention including light pipes 12, reflectors 14, light sources 16 and mirrors 24. In particular, FIG. 9A shows a lighting device having a main reflector 14 at one end of a light pipe 12 as described previously. FIG. 9B, on the other hand, illustrates an embodiment having two symmetrical main reflectors 14 at either end of a light pipe 12. This arrangement is desirable for long light pipes so as to obtain substantially uniform intensity beyond the length over which the pipe could conduct light from one source efficiently.

Figure 9C:
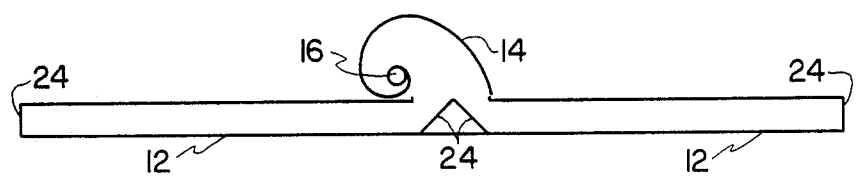
Figure 9D:
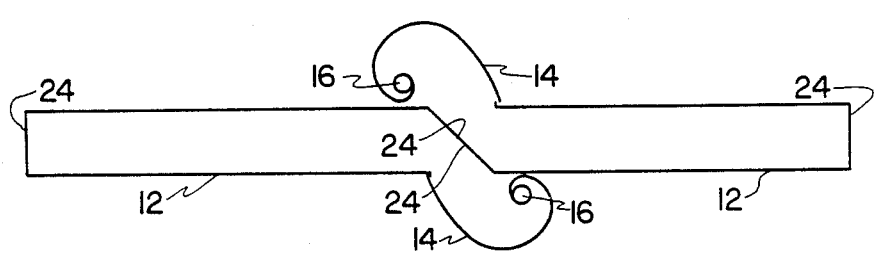

FIGS. 9C and 9D show other embodiments of the light system which may be used to distribute light over a length longer than that which the light pipe could efficiently conduct light from a single source.

Figure 9E:
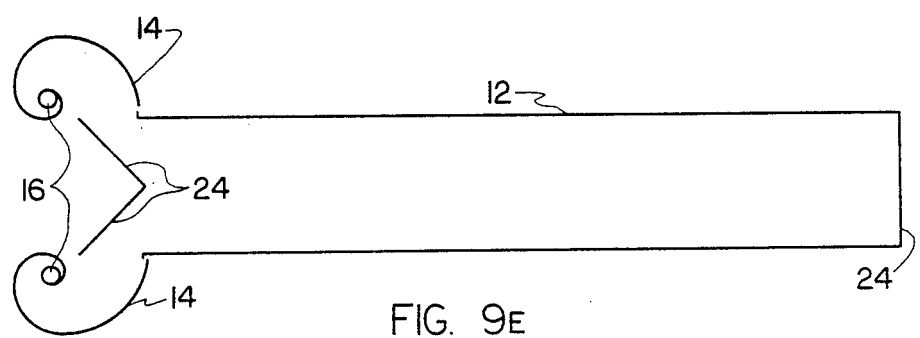
Figure 9F:
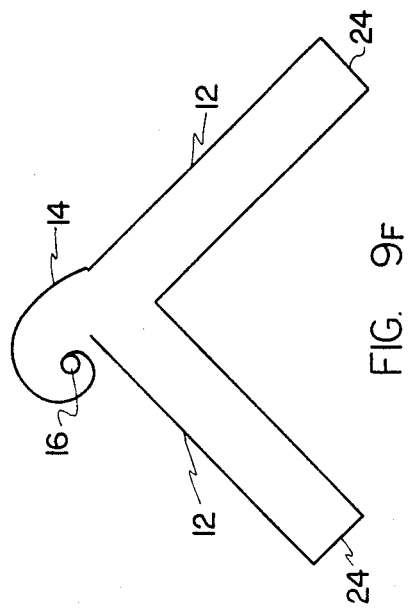
Figure 9G:
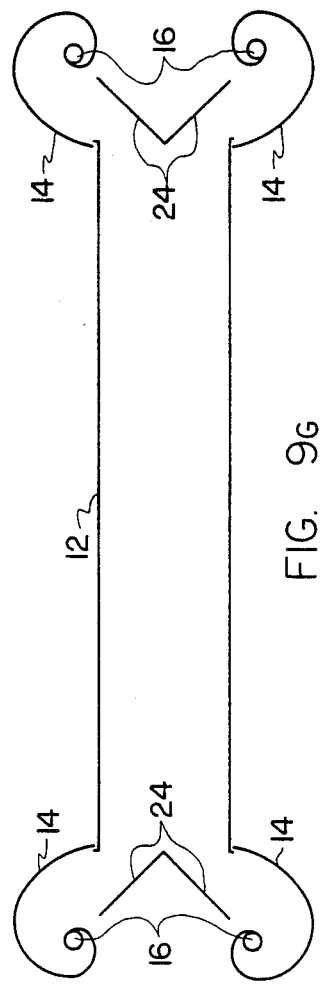

Similarly, FIGS. 9E and 9G illustrate embodiments which are particularly useful for obtaining a substantially uniform inflow of light across the entrance of a wide light pipe.

FIG. 9F illustrates an embodiment of the lighting device in which two light pipes fed from a single main reflector are angled to achieve a special lighting effect.

While preferred embodiments of this invention have been described in detail, it will be apparent that certain modifications or alterations can be made therein without departing from the spirit or scope of the invention as set forth in the appended claims.

I claim:

1. A reflector for directing light from a source toward an outlet area comprising a reflector body having an inner reflective surface, said reflector body having a continuous longitudinal profile including:
   (a) a first substantially circular arc having a first arc radius;
   (b) a second substantially circular arc which substantially continues said first arc and which has a second arc radius longer than said first arc radius such that said first and second arc radii have a ratio of lengths of substantially $\frac{1}{2}(1+\sqrt{5})$;
   (c) a third substantially circular arc which substantially continues said second arc and which has a third arc radius longer than said second arc radius such that said second and third arc radii have a ratio of lengths of substantially $\frac{1}{2}(1+\sqrt{5})$;
   (d) a fourth substantially circular arc which substantially continues said third arc and which has a fourth arc radius longer than said third arc radius such that said third and fourth arc radii have a ratio of lengths of substantially $\frac{1}{2}(1+\sqrt{5})$; and
   (e) a parabolic arc which continues said fourth substantially circular arc.

2. A reflector according to claim 1 wherein a cross-sectional profile of the reflector body is substantially in the form of a parabolic arc.

3. A reflector according to claim 2 wherein the reflector body has a flat portion for accommodating the length of the light source.

4. A reflector according to claim 1 including internal reflecting means disposed near said source for directing a first portion of the light away from a dispersive point on said inner reflective surface, said dispersive point being so positioned as to direct said first portion of light out of substantial alignment with a preferred exit direction.

5. A reflector according to claim 1 including external reflecting means disposed near said outlet area for directing a second portion of the light near the outlet area toward a preferred exit direction.

6. A reflector according to claim 1 wherein a cross-sectional profile of the reflector body is substantially flat.

7. A lighting system comprising a reflector having a reflector body with a reflective inner surface and a light source disposed within the reflector, said reflector body having a continuous longitudinal profile including:
  (a) a first substantially circular arc having a first arc radius;
  (b) a second substantially circular arc which substantially continues said first arc and which has a second arc radius longer than said first arc radius such that said first and second arc radii have a ratio of lengths of substantially $\frac{1}{2}(1+\sqrt{5})$;
  (c) a third substantially circular arc which substantially continues said second arc and which has a third arc radius longer than said second arc radius such that said second and third arc radii have a ratio of lengths of substantially $\frac{1}{2}(1+\sqrt{5})$; and
  (d) a fourth substantially circular arc which substantially continues said third arc and which has a fourth arc radius longer than said third arc radius such that said third and fourth arc radii have a ratio of lengths of substantially $\frac{1}{2}(1+\sqrt{5})$; and
  (e) a parabolic segment which continues said fourth substantially circular arc.

8. A lighting system according to claim 7 wherein a cross-sectional profile of the reflector body is substantially in the form of a parabolic arc.

9. A lighting system according to claim 8 wherein the reflector body has a flat portion for accommodating the length of the light source.

10. A lighting system according to claim 7 wherein a cross-sectional profile of the reflector body is substantially flat.

11. A lighting device according to claim 7 including internal reflecting means disposed near said source for directing a first portion of the light from said light source away from a dispersive point on said inner reflective surface, said dispersive point being so positioned as to direct light out of substantial alignment with a preferred exit direction.

12. A lighting device according to claim 7 wherein said reflector includes an exit area and said lighting device includes external reflecting means disposed near an outlet area of said reflector for directing a second portion of the light near the outlet area toward a preferred direction.

13. A lighting device according to claim 7 including a light pipe, one end of said light pipe engaging an outlet area of said reflector for receiving light from said reflector.

14. A lighting device according to claim 13 including internal reflecting means disposed near said source for directing a first portion of the light from said light source away from a dispersive point on said inner reflective surface, said dispersive point being so positioned as to direct light out of substantial alignment with a central axis of said light pipe.

15. A lighting device according to claim 13 wherein said reflector includes an exit area and said lighting device includes external reflecting means disposed near an outlet area of said reflector for directing a second portion of the light near the outlet area toward substantial alignment with a central axis of said light pipe.

16. A lighting system according to claim 13 wherein said light pipe includes a wall portion composed of grooved plastic whereby said light is directed substantially along the length of said light pipe.

17. A lighting system according to claim 16 wherein said light pipe includes a light releasing mechanism.

18. A lighting device according to claim 13 including a second reflector positioned at an end of said light pipe remote from said one end, said second reflector having a second reflector body with a reflective inner surface and a continuous longitudinal profile including:
  (a) a first substantially circular arc having a first arc radius;
  (b) a second substantially circular arc which substantially continues said first arc and which has a second arc radius longer than said first arc radius such that said first and second arc radii have a ratio of lengths of substantially $\frac{1}{2}(1+\sqrt{5})$;
  (c) a third substantially circular arc which substantially continues said second arc and which has a third arc radius longer than said second arc radius such that said second and third arc radii have a ratio of lengths of substantially $\frac{1}{2}(1+\sqrt{5})$; and
  (d) a fourth substantially circular arc which substantially continues said third arc and which has a fourth arc radius longer than said third arc radius such that said third and fourth arc radii have a ratio of lengths of substantially $\frac{1}{2}(1+\sqrt{5})$; and
  (e) a parabolic segment which continues said third substantially circular arc.

19. A reflector for directing light from a source toward an outlet area comprising a reflector body having an inner reflective surface, said reflector body having a longitudinal profile including:
  (a) a first substantially circular arc having a first arc radius;
  (b) a second substantially quarter-circular arc which substantially continues said first arc and which has a second arc radius longer than said first arc radius such that said first and second arc radii have a ratio of lengths of substantially $\frac{1}{2}(1+\sqrt{5})$;
  (c) a third substantially quarter-circular arc which substantially continues said second arc and which has a third arc radius longer than said second arc radius such that said second and third arc radii have a ratio of lengths of substantially $\frac{1}{2}(1+\sqrt{5})$; and
  (d) a fourth substantially quarter-circular arc which substantially continues said third arc and which has a fourth arc radius longer than said third arc radius such that said third and fourth arc radii have a ratio of lengths of substantially $\frac{1}{2}(1+\sqrt{5})$; and
  (e) a fifth substantially circular arc which substantially continues said fourth arc and which has a fifth arc radius longer than said fourth arc radius such that said fourth and fifth arc radii have a ratio of lengths of substantially $\frac{1}{2}(1+\sqrt{5})$.

20. A reflector according to claim 19 wherein a cross-sectional profile of the reflector body is substantially in the form of a parabolic arc.

21. A reflector according to claim 20 including external reflecting means disposed near said outlet area for directing a second portion of the light near the outlet area toward a preferred exit direction.

22. A reflector according to claim 19 wherein the reflector body has a flat portion for accommodating the length of the light source.

23. A reflector according to claim 19 including internal reflecting means disposed near said source for directing a first portion of the light away from a dispersive point on said inner reflective surface, said dispersive point being so positioned as to direct said first portion of light out of substantial alignment with a preferred exit direction.

24. A reflector according to claim 19 wherein a cross-sectional profile of the reflector body is substantially flat.

* * * * *